(12) United States Patent
Johansson et al.

(10) Patent No.: US 12,202,851 B2
(45) Date of Patent: Jan. 21, 2025

(54) METHOD FOR PRODUCING OXIDIZED LIGNINS

(71) Applicant: ROCKWOOL INTERNATIONAL A/S, Hedehusene (DK)

(72) Inventors: Dorte Bartnik Johansson, Roskilde (DK); Povl Nissen, Olstykke (DK)

(73) Assignee: ROCKWOOL A/S, Hedehusene (DK)

( * ) Notice: Subject to any disclaimer, the term of this patent is extended or adjusted under 35 U.S.C. 154(b) by 849 days.

(21) Appl. No.: 17/282,131

(22) PCT Filed: Oct. 7, 2019

(86) PCT No.: PCT/EP2019/077133
§ 371 (c)(1),
(2) Date: Apr. 1, 2021

(87) PCT Pub. No.: WO2020/070341
PCT Pub. Date: Apr. 9, 2020

(65) Prior Publication Data
US 2021/0371444 A1 Dec. 2, 2021

(30) Foreign Application Priority Data

Oct. 5, 2018 (EP) .................................. 18198997
Oct. 5, 2018 (EP) .................................. 18198999

(51) Int. Cl.
| | | |
|---|---|---|
| C07G 1/00 | (2011.01) | |
| B01J 19/18 | (2006.01) | |
| C09J 197/00 | (2006.01) | |

(52) U.S. Cl.
CPC ............... C07G 1/00 (2013.01); B01J 19/18 (2013.01); C09J 197/005 (2013.01)

(58) Field of Classification Search
CPC .......... C07G 1/00; B01J 19/18; C09J 197/005
USPC ....................................................... 530/500
See application file for complete search history.

(56) References Cited

U.S. PATENT DOCUMENTS

| | | | |
|---|---|---|---|
| 3,093,604 A | 6/1963 | Ayers | |
| 3,227,667 A | 1/1966 | Moffitt et al. | |
| 3,285,801 A | 11/1966 | Sarjeant | |
| 5,318,990 A | 6/1994 | Strauss | |
| 6,238,475 B1 | 5/2001 | Gargulak et al. | |
| 6,706,853 B1 | 3/2004 | Stanssens et al. | |
| 6,818,699 B2 | 11/2004 | Kajimaru et al. | |
| 7,265,169 B2 | 9/2007 | Li et al. | |
| 2004/0034154 A1 | 2/2004 | Tutin et al. | |
| 2007/0077837 A1 | 4/2007 | Lundquist | |
| 2007/0173588 A1 | 7/2007 | Espiard et al. | |
| 2009/0098387 A1 | 4/2009 | Brady et al. | |
| 2009/0169867 A1 | 7/2009 | Kelly | |
| 2010/0069533 A1 | 3/2010 | Brady et al. | |

(Continued)

FOREIGN PATENT DOCUMENTS

| | | |
|---|---|---|
| CN | 107286873 A | 10/2017 |
| CN | 107459385 A | 12/2017 |

(Continued)

OTHER PUBLICATIONS

Bouajila et al., "Some Laws of Lignin Plasticization", Journal of Applied Polymer Science, vol. 102, 2006, pp. 1445-1451.
Urkhanova et al., "Fiber-reinforced concrete with mineral fibers and nanosilica", Procedia Engineering 195 (Jul. 20, 2017), pp. 147-154.
Garyntseva N. V. Composition, properties and use of lignins derived from oxidative delignification of fir, birch and aspen wood and suberin of birch bark. May 21, 2003—Technology and equipment of wood biomass chemical processing, Author's abstract of a Ph.D. thesis in Chemistry. Krasnoyarsk: 2013.

(Continued)

*Primary Examiner* — David T Karst
(74) *Attorney, Agent, or Firm* — Abel Schillinger, LLP

(57) ABSTRACT

The present invention is directed to a method for producing oxidized lignins.

20 Claims, 5 Drawing Sheets

(56) References Cited

U.S. PATENT DOCUMENTS

| | | | |
|---|---|---|---|
| 2010/0112242 | A1 | 5/2010 | Medoff |
| 2011/0159768 | A1 | 6/2011 | Crescimanno et al. |
| 2014/0030540 | A1 | 1/2014 | Valkonen |
| 2014/0163142 | A1 | 6/2014 | Zhang et al. |
| 2016/0244364 | A1 | 8/2016 | Kalliola et al. |
| 2018/0312625 | A1 | 11/2018 | Phanopoulos et al. |
| 2019/0136062 | A1 | 5/2019 | Alvarado et al. |
| 2019/0338168 | A1 | 11/2019 | Laine et al. |
| 2019/0390374 | A1 | 12/2019 | Fournier et al. |

FOREIGN PATENT DOCUMENTS

| | | | |
|---|---|---|---|
| EP | 0583086 | A | 2/1994 |
| EP | 0990727 | A1 | 4/2000 |
| EP | 1741726 | A1 | 1/2007 |
| EP | 3299421 | A1 | 3/2018 |
| JP | 2014065779 | A | 4/2014 |
| RU | 2345112 | C2 | 1/2009 |
| WO | 9831763 | A1 | 7/1998 |
| WO | 9936368 | A1 | 7/1999 |
| WO | 0105725 | A1 | 1/2001 |
| WO | 0196460 | A2 | 12/2001 |
| WO | 0206178 | A1 | 1/2002 |
| WO | 2004007615 | A1 | 1/2004 |
| WO | 2006061249 | A1 | 6/2006 |
| WO | 2008023032 | A1 | 2/2008 |
| WO | 2008073186 | A2 | 6/2008 |
| WO | 2011042610 | A1 | 4/2011 |
| WO | 2012113058 | A1 | 8/2012 |
| WO | 2012136894 | A1 | 10/2012 |
| WO | 2014080033 | A1 | 5/2014 |
| WO | 2015049424 | A1 | 4/2015 |
| WO | 2017067769 | A1 | 4/2017 |
| WO | 2017188874 | A1 | 11/2017 |
| WO | 2018122470 | A1 | 7/2018 |
| WO | 2018138450 | A1 | 8/2018 |

OTHER PUBLICATIONS

Beloglazova A.L. Catalytic oxidation of model lignin compounds and preparations by peroxide compounds in the presence of Mn-containing sodium vanadomolybdo-phosphate. May 21, 2003—Technology and equipment of wood biomass chemical processing, wood chemistry, Author's abstract of a Ph.D. thesis in Chemistry.—Arkhangelsk: 2015.—p. 14, Fig. 8 a, paragraph 2 from the top.

Moskvichev Yu. A et al. Theoretical background of chemical technology: Manual. 2nd edition, amended—SPb.: Editorial House "Lan", 2016,—p. 6, paragraph 3 to 4 from the top.

Xiangwei Zhu et al., "Bio-Based Wood Adhesive from Camelina Protein (a Biodiesel Residue) and Depolymerized Lignin with Improved Water Resistance", ACS Omega, (Nov. 16, 2017), vol. 2, No. 11, ISSN 2470-1343, pp. 7996-8004.

Richard J.A. Gosselink et al., "Effect of periodate on lignin for wood adhesive application", Holzforschung: International Journal of the Biology, Chemistry, Physics and Technology of Wood, DE, (Jan. 1, 2011), vol. 65, No. 2, ISSN 0018-3830, pp. 155-162.

Venla Hemmilä et al., "Lignin: an adhesive raw material of the future or waste of research energy?", Northern European Network for Wood Science and Engineering (WSE), (Jan. 1, 2013), pp. 98-103.

Masoumeh Ghorbani et al., "Ammoxidized Fenton-Activated Pine Kraft Lignin Accelerates Synthesis and Curing of Resole Resins", Polymers, (Jan. 28, 2017), vol. 9, No. 12, p. 43, p. 54, p. 55.

Dietrich Meier et al., "Conversion of technical lignins into slow-release nitrogenous fertilizers by ammoxidation in liquid phase", Bioresource Technology, (Jan. 1, 1994), pp. 121-128.

U.S. Appl. No. 17/282,126, filed Apr. 1, 2021.
U.S. Appl. No. 17/282,128, filed Apr. 1, 2021.
U.S. Appl. No. 17/282,130, filed Apr. 1, 2021.

"Properties of Hydrogen Peroxide", Editorial board of «Inorganic Chemistry», «Inorganic Chemistry vol. II», Peoples Education Press, 1st Edition, 2nd Print, Oct. 1978, pp. 82-83 (CN).

METHOD FOR PRODUCING OXIDIZED LIGNINS

FIELD OF THE INVENTION

The present invention relates to a method for producing oxidized lignins, an oxidized lignin prepared by such a method and the use of such oxidized lignins as a component in a binder composition, such as an aqueous binder composition for mineral fibers; such as a component in an aqueous adhesive composition for lignocellulosic materials. The present invention also relates to an apparatus for performing the method according to the present invention.

BACKGROUND OF THE INVENTION

Lignin is a class of complex organic polymers found as structural materials in vascular plants. It forms about 20-35% of the dry mass of wood and is therefore, except cellulose, the most abundant polymer found in nature. Lignin is a side product in the process of paper making and therefore vast amounts of lignin are produced in the paper making industry. The lignin separated in the paper making process is usually burnt as fuel. In view of this, lignin is a very inexpensive product which makes it an attractive starting material.

FIG. 1 shows a section from a possible lignin structure.

Accordingly, lignin represents an attractive feedstock due to availability and potentially low price. It is also the main renewable aromatic source. Lignin is composed of three primary units (often called monolignols) linked through ether and C—C bonds (FIG. 2). Representation of these three monolignols depends on the source material although guaiacyl (G) is the most abundant in softwood lignin, guaiacyl and syringyl in hardwood lignin while all three are fairly represented in grasses.

One potential use of lignins is the use in binders, such as binders for mineral fibres.

There are several important characteristics of lignin in relation to binders. Lignin is an aromatic polymer with high glass transition temperature ($T_g$). Lignin thermally decomposes over a wide range of temperatures as different oxygen containing moieties possess different stability and reactions that are occurring can be consecutive but also competing due to hindered structure of lignin polymer. Lignin surface chemistry properties (like surface tension components) are similar to the same properties of cured phenol formaldehyde (PF) binders. This situation makes the reasonable assumption that adhesion properties of lignin can be at the similar level as those of long time used PF binders in insulation materials but also in binding wood etc. However, lignin is an inherently heterogeneous material and on top of that, the lignin properties and structures are different based on various techniques being employed in extracting lignin from biomass. The differences come in terms of structure, bonding pattern of lignin aromatic units, molecular weight etc.

The reactive functional group being present in high amounts in a typical lignin is the hydroxyl group, being either phenolic or aliphatic hydroxyl group. The presence of phenolic hydroxyl group also activates the aromatic ring towards reactions with aldehydes. Overall, it can be said that lignin structure limits the choice of cross-linkers to most often environmentally compromised reagents and therefore limits the possibility to use lignin as a starting material in processes which include chemical reactions.

In order to utilize lignins as starting materials for different uses, chemical derivatizations of lignins have been proposed. One of the proposed ways of derivatizing lignin is oxidation. Oxidation of lignin is usually carried out with strong oxidation agents in the presence of alkali metal hydroxides.

However, one problem associated with the previously known oxidized lignins is that they are less fire resistant when used in products where they are comprised in a binder composition, compared to the underivatized lignins, said underivatized lignins rendering them unsuitable for many applications. A further problem associated with these previously known oxidized lignins is that residual alkali metal hydroxide in the product tends to render the products unstable and makes them susceptible to changing their properties in an aging process.

Further, previously known derivatization processes for lignins often lack high throughput and are therefore not suitable for the production of derivatized lignins in amounts suitable for industrial mass production.

SUMMARY OF THE INVENTION

Accordingly, it was an object of the present invention to provide a process for the derivatization of lignins which overcomes the disadvantages of previously known derivatization processes of a lignin.

In particular, it was an object of the present invention to provide a process for the derivatization of lignins that result in derivatized lignins having desired reactivity and at the same time are more fire resistant when used in products where they are comprised in a binder composition, compared to underivatized lignins, and further having improved long term stability.

Further, it was an object of the present invention to provide a process for the derivatization of lignins that allows the production of derivatized lignins with high throughput in amounts suitable for them to be used as a material in industrial mass production.

A further object of the present invention was to provide derivatized lignins prepared according to the method.

A further object of the present invention was to provide a use for derivatized lignins prepared according to the method.

A further object of the present invention was to provide an apparatus for preparing derivatized lignins.

In accordance with a first aspect of the present invention, there is provided a method for producing oxidized lignins comprising bringing into contact a component (i) comprising one or more lignins a component (ii) comprising ammonia and/or one or more amine components, and/or any salt thereof and/or an alkali and/or earth alkali metal hydroxide, such as sodium hydroxide and/or potassium hydroxide a component (iii) comprising one or more oxidation agents a component (iv) in form of one or more plasticizers.

In accordance with a second aspect of the present invention, there is provided an oxidized lignin prepared by a method according to the present invention.

In accordance with a third aspect of the present invention, there is provided a use of the oxidized lignins prepared by the method according to the present invention in a binder composition, such as an aqueous binder composition for mineral fibres.

In accordance with a fourth aspect of the present invention, there is provided an apparatus for performing the method according to the present invention.

DESCRIPTION OF THE PREFERRED EMBODIMENT

Figure 1:
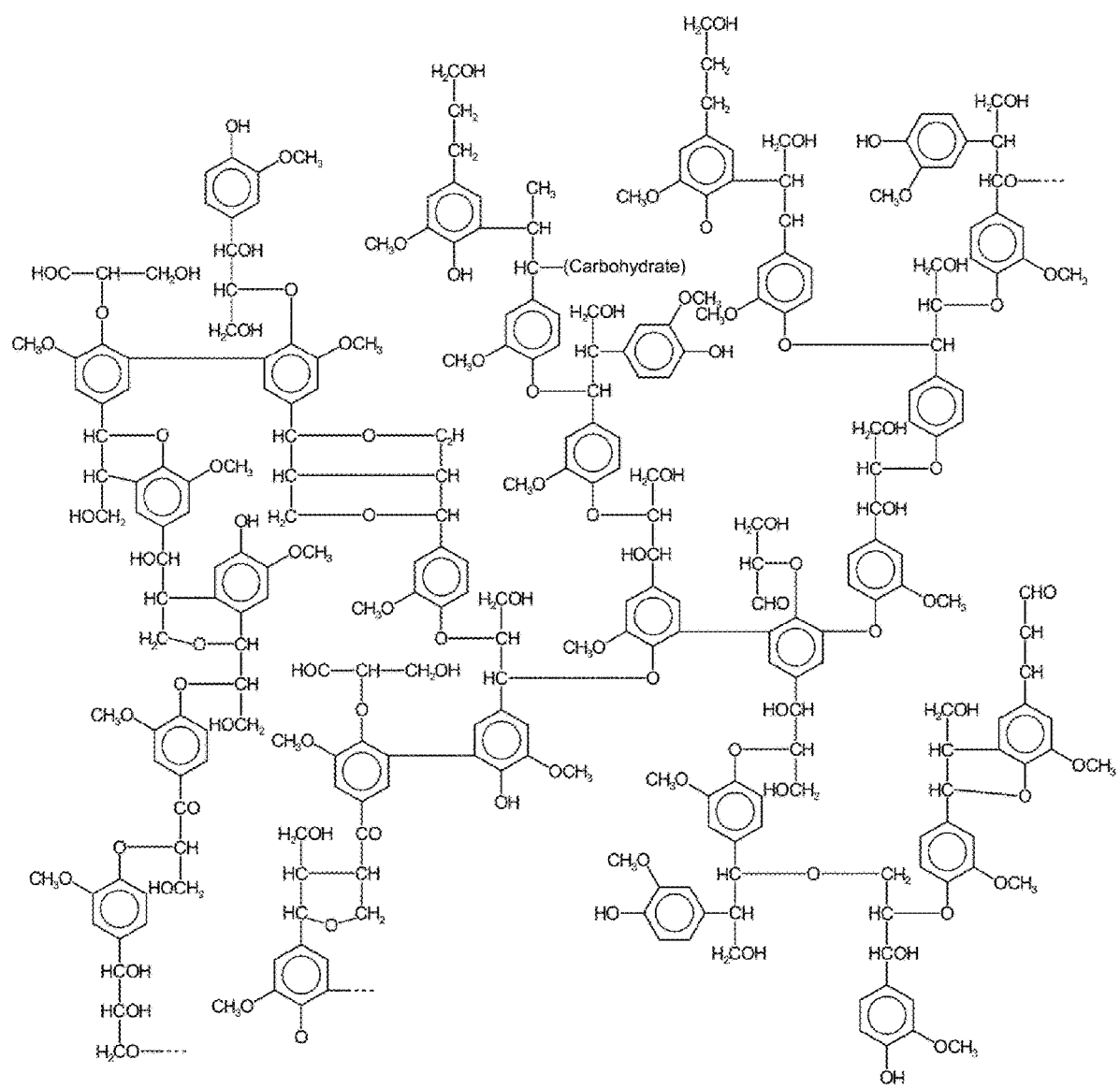
FIG. 1 shows a section from a possible lignin structure.
Figure 2:
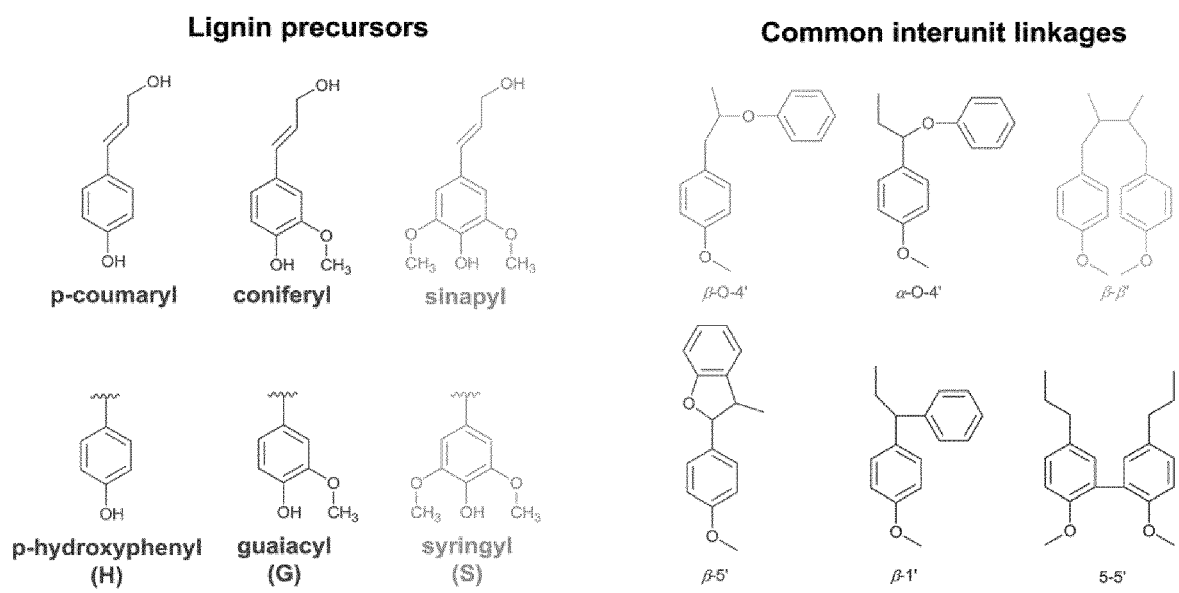
FIG. 2 shows structures of lignin precursors and common interunit linkages.
Figure 3:
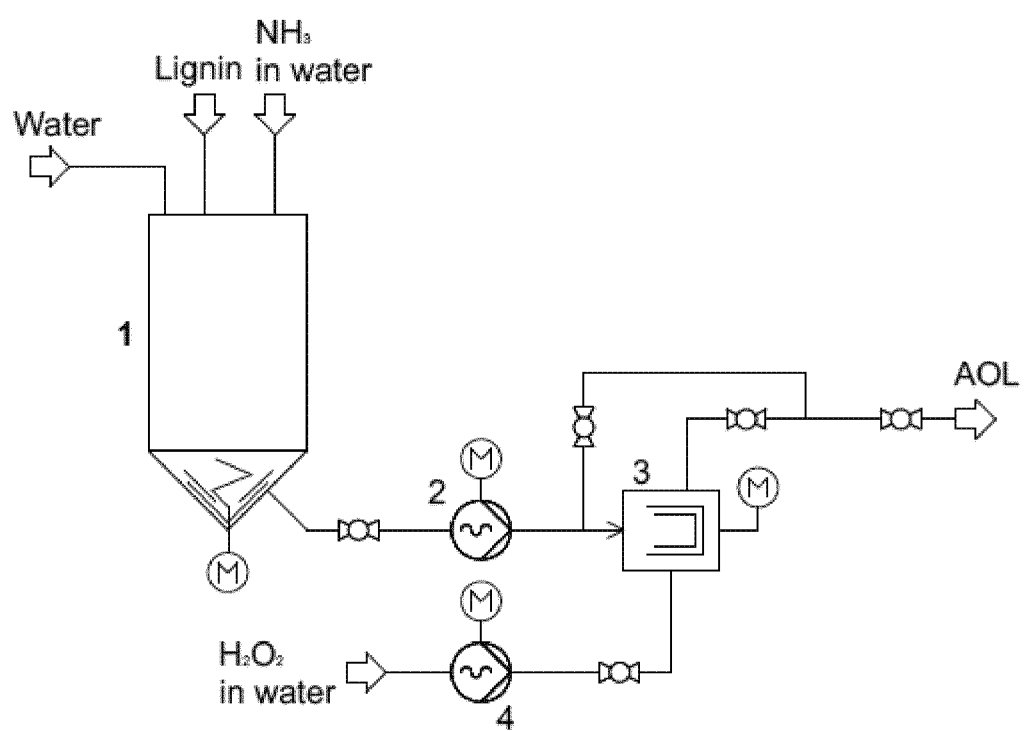
FIG. 3 shows an apparatus for carrying out the method of the present invention.

The method according to the present invention is a method for producing oxidized lignins comprising bringing into contact
- a component (i) comprising one or more lignins
- a component (ii) comprising ammonia and/or one or more amine components, and/or any salt thereof and/or an alkali and/or earth alkali metal hydroxide, such as sodium hydroxide and/or potassium hydroxide
- a component (iii) comprising one or more oxidation agents
- a component (iv) in form of one or more plasticizers.

Component (i)

Component (i) comprises one or more lignins.

In one embodiment of the method according to the present invention, component (i) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (i) comprises one or more kraft lignins.

Component (ii)

In one embodiment according to the present invention, component (ii) comprises ammonia, one or more amino components, and/or any salts thereof and/or an alkali and/or earth alkali metal hydroxide, such as sodium hydroxide and/or potassium hydroxide.

"Ammonia-oxidized lignins" is to be understood as a lignin that has been oxidized by an oxidation agent in the presence of ammonia. The term "ammonia-oxidized lignin" is abbreviated as AOL.

In one embodiment, component (ii) comprises ammonia and/or any salt thereof.

Without wanting to be bound by any particular theory, the present inventors believe that the improved stability properties of the derivatized lignins prepared according to the present invention with component (ii) being ammonia and/or any salt thereof are at least partly due to the fact that ammonia is a volatile compound and therefore evaporates from the final product or can be easily removed and reused.

Nevertheless, it can be advantageous in this embodiment of the method according to the present invention that component (ii), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (ii) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (iii)

In the method according to the present invention, component (iii) comprises one or more oxidation agents.

In one embodiment, component (iii) comprises one or more oxidation agents in form of hydrogen peroxide, organic or inorganic peroxides, molecular oxygen, ozone, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism, multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (iii) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

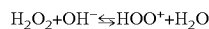

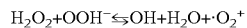

The present inventors have found that the derivatized lignins prepared with the method according to the present invention contain increased amounts of carboxylic acid groups as a result of the oxidation process. Without wanting to be bound by any particular theory, the present inventors believe that the carboxylic acid group content of the oxidized lignins prepared in the process according to the present invention plays an important role in the desirable reactivity properties of the derivatized lignins prepared by the method according to the present invention.

Another advantage of the oxidation process is that the oxidized lignin is more hydrophilic. Higher hydrophilicity can enhance solubility in water and facilitate the adhesion to polar substrates such as mineral fibres.

Component (iv)

Component (iv) comprises one or more plasticizers.

In one embodiment according to the present invention, component (iv) comprises one or more plasticizers in form of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

The present inventors have found that the inclusion of component (iv) in form of one or more plasticizers provides a decrease of the viscosity of the reaction mixture which allows a very efficient method to produce oxidised lignins.

In one embodiment according to the present invention, component (iv) comprises one or more plasticizers in form of polyols, such as carbohydrates, hydrogenated sugars, such as sorbitol, erythriol, glycerol, monoethylene glycol, polyethylene glycols, polyvinyl alcohol, acrylic based polymers with free carboxy groups and/or polyurethane dispersions with free carboxy groups, polyamides, amides such as carbamide/urea, or any mixtures thereof.

In one embodiment according to the present invention, component (iv) comprises one or more plasticizers selected from the group of polyethylene glycols, polyvinyl alcohol, urea or any mixtures thereof.

Further Components

In one embodiment, the method according to the present invention comprises further components, in particular a component (v) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method according to the present invention.

Mass Ratios of the Components

The person skilled in the art will use the components (i), (ii), (iii), and (iv) in relative amounts that the desired degree of oxidation of the lignins is achieved.

In one embodiment, the method according to the present invention is carried out such that the method comprises
 a component (i) comprises one or more lignins
 a component (ii) comprises ammonia
 a component (iii) comprises one more oxidation agents in form of hydrogen peroxide,
 a component (iv) comprises one or more plasticizers selected from the group of polyethylene glycol,
 wherein the mass ratios of lignin, ammonia, hydrogen peroxide and polyethylene glycol are such that the amount of ammonia is 0.01 to 0.5 weight parts, such as 0.1 to 0.3, such as 0.15 to 0.25 weight parts ammonia (25 weight % solution in water), based on the dry weight of lignin, and wherein the amount of hydrogen peroxide (30 weight % solution in water) is 0.025 to 1.0 weight parts, such as 0.07 to 0.50 weight parts, such as 0.15 to 0.30 weight parts hydrogen peroxide, based on the dry weight of lignin, and wherein the amount of polyethylene glycol is 0.03 to 0.60 weight parts, such as 0.07 to 0.50 weight parts, such as 0.10 to 0.40 weight parts polyethylene glycol, based on the dry weight of lignin.

For the purpose of the present invention, the "dry weight of lignin" is preferably defined as the weight of the lignin in the supplied form.

Process

There is more than one possibility to bring the components (i), (ii), (iii), and (iv) in contact to achieve the desired oxidation reaction.

In one embodiment, the method comprises the steps of:
 a step of providing component (i) in form of an aqueous solution and/or dispersion of one more lignins, the lignin content of the aqueous solution being 5 to 90 weight-%, such as 10 to 85 weight-%, such as 15 to 70 weight-%, based on the total weight of the aqueous solution;
 a pH adjusting step by adding component (ii);
 a step of adding component (iv);
 an oxidation step by adding component (iii) comprising an oxidation agent.

In one embodiment, the pH adjusting step is carried so that the resulting aqueous solution and/or dispersion is having a pH ≥9, such as ≥10, such as ≥10.5.

In one embodiment, the pH adjusting step is carried out so that the resulting aqueous solution and/or dispersion is having a pH in the range of 9.5 to 12.

In one embodiment, the pH adjusting step is carried out so that the temperature is allowed to raise to ≥25° C. and then controlled in the range of 25-50° C., such as 30-45° C., such as 35-40° C.

In one embodiment, during the oxidation step, the temperature is allowed to raise to ≥35° C. and is then controlled in the range of 35-150° C., such as 40-90° C., such as 45-80° C.

In one embodiment, the oxidation step is carried out for a time of 1 seconds to 24 hours, such as 1 minutes to 12 hours, such as 10 minutes to 8 hours, such as 5 minutes to 1 hour.

The present inventors have found that the process according to the present invention allows to produce a high dry matter content of the reaction mixture and therefore a high throughput is possible in the process according to the present invention which allows the reaction product in form of the oxidised lignins to be used as a component in industrial mass production products such as mineral fibre products.

In one embodiment, the method according to the present invention is carried out such that the dry matter content of the reaction mixture is 20 to 80 wt. %, such as 40 to 70 wt. %.

In one embodiment, the method according to the present invention is carried out such that the viscosity of the oxidised lignin has a value of 100 cP to 100.000 cP, such as a value of 500 cP to 50.000 cP, such as a value of 1.000 cP to 25.000 cP.

For the purpose of the present invention, viscosity is dynamic viscosity and is defined as the resistance of the liquid/paste to a change in shape, or movement of neighbouring portions relative to one another. The viscosity is measured in centipoise (cP), which is the equivalent of 1 mPa s (milipascal second). Viscosity is measured at 20° C. using a viscometer. For the purpose of the present invention, the dynamic viscosity can be measured at 20° C. by a Cone Plate Wells Brookfield Viscometer.

In one embodiment, the method according to the present invention is carried out such that the method comprises a rotator-stator device.

In one embodiment, the method according to the present invention is carried out such that the method is performed as a continuous or semi-continuous process.

Apparatus for Performing the Method

The present invention is also directed to an apparatus for performing the method described above.

In one embodiment, the apparatus for performing the method comprises:
 a rotor-stator device,
 a premixing device for component (i), (ii), (iv)
 one or more inlets for water, components (i), (ii), (iii) and (iv),
 one or more outlets for an oxidised lignin.

In one embodiment, the apparatus is constructed in such a way that the inlets for
 the premix of the components (i), (ii) and (iv) are to the rotor-stator device
 and the apparatus furthermore comprises a chamber,
 said chamber having an inlet for component (iii) and
 said chamber having an outlet for an oxidised lignin.

A rotator-stator device is a device for processing materials comprising a stator configured as an inner cone provided with gear rings. The stator cooperates with a rotor having arms projecting from a hub. Each of these arms bears teeth meshing with the teeth of the gear rings of the stator. With each turn of the rotor, the material to be processed is transported farther outward by one stage, while being subjected to an intensive shear effect, mixing and redistribution. The rotor arm and the subjacent container chamber of the upright device allow for a permanent rearrangement of the material from the inside to the outside and provide for a multiple processing of dry and/or highly viscous matter so that the device is of excellent utility for the intensive mixing, kneading, fibrillating, disintegrating and similar processes important in industrial production. The upright arrangement of the housing facilitates the material's falling back from the periphery toward the center of the device.

In one embodiment, the rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

For more details of the rotator-stator device to be used in one embodiment of the method according to the present invention, reference is made to US 2003/0042344 A1, which is incorporated by reference.

In one embodiment, the method according to the present invention is carried out such that the method uses one rotator-stator device. In this embodiment, the mixing of the components and the reaction of the components is carried out in the same rotator-stator device.

In one embodiment, the method according to the present invention is carried out such that the method uses two or more rotator-stator devices, wherein at least one rotator-stator device is used for the mixing of the components and at least one rotator-stator device is used for reacting the components.

This process can be divided into two steps:
1. Preparation of the Lignin mass (i)+(ii)+(iv)
2. Oxidization of the lignin mass Typically, two different types of rotor-/stator machines are used:
1. Open rotor-/stator machine suitable for blending in the lignin powder into water on a very high concentration (30 to 50 wt-%). Less intensive mixing but special auxiliaries (inlet funnel, screw etc.) to handle highly viscous materials. Lower circumferential speed (up to 15 m/s). The machine can be used as batch system or continuous.
2. Inline rotor-/stator machine which has much higher shear forces—circumferential speeds of up to 55 m/s)—and creates beneficial conditions for a very quick chemical reaction. The machine is to be used continuously.

Such an embodiment is shown in FIG. 1 whereby (1) shows the first rotator-stator device used for mixing the components, (2) and (4) show pumps and (3) shows a second rotator-stator device used for reacting the components.

In the open rotor-/stator system (1) the highly concentrated (45 to 50 wt-%) mass of Lignin/water is prepared. The lignin powder is added slowly to the warm water (30 to 60 deg. C.) in which the correct amount of watery ammonia and/or alkali base have been added. This can be done in batch mode, or the materials are added intermittently/continuously creating a continuous flow of mass to the next step.

Figure 4:
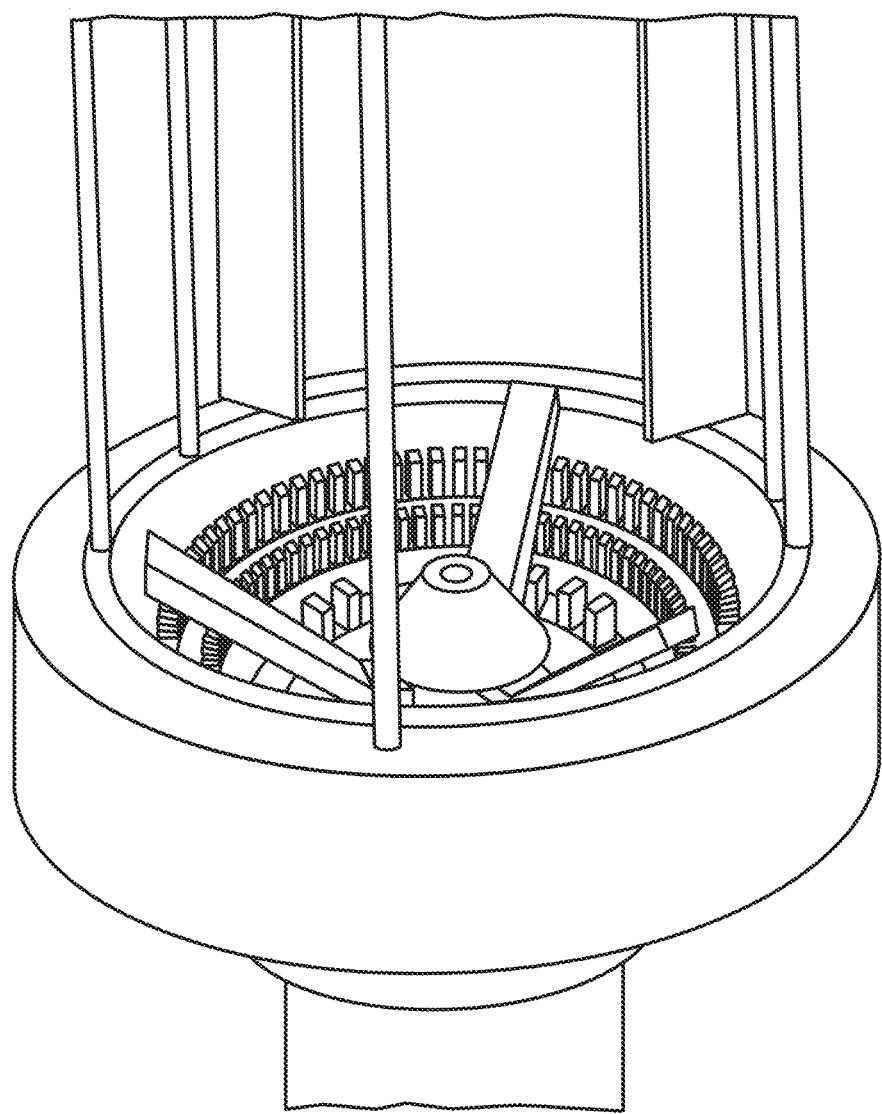
FIG. 4 shows an example of an open rotor-stator system for use in the method of the present invention.

FIG. 4 shows an example of an open rotor-/stator system without guiding funnel and central transport screw which is mounted in the center of the rotor.

The created mass should be kept at a temperature of about 60 deg. to keep the viscosity as low as possible and hence the material pumpable. The hot mass of lignin/water at a pH of 9 to 12 is then transferred using a suitable pump (2), e.g. progressive cavity pump or another volumetric pump, to the oxidation step.

Figure 5:
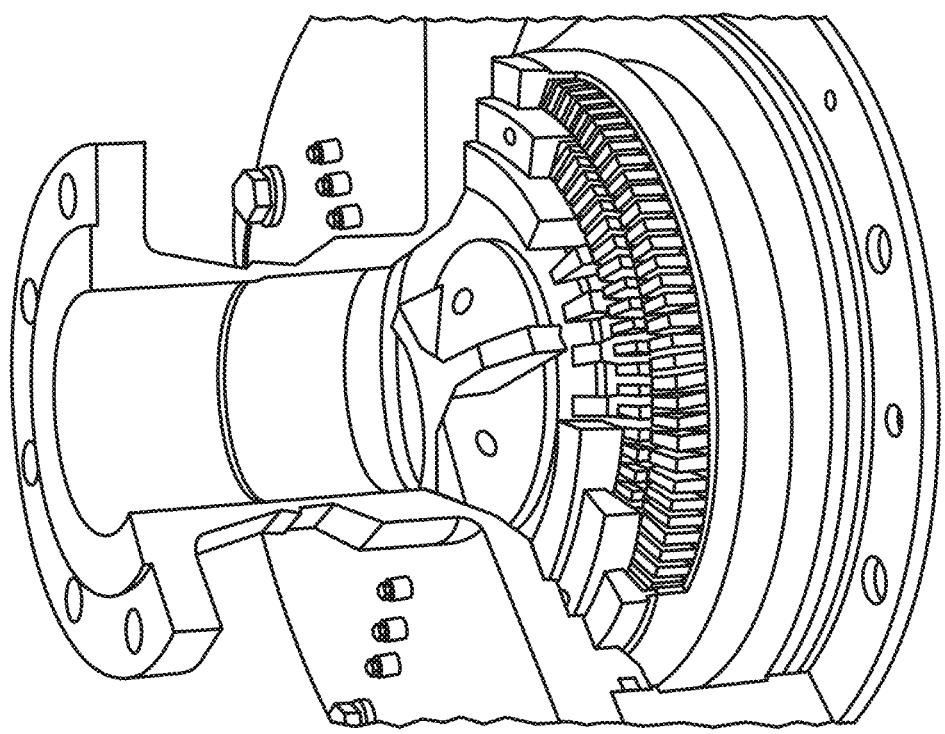
FIG. 5 shows an inline rotor-stator system for use in the method of the present invention.

FIG. 5 shows an example of an inline rotor-/stator system; the material enters axially and leaves the reactor radially.

The oxidation is done in a closed rotor-/stator system (3) in a continuous inline reaction. A watery solution of Ammonia and/or alkali base is dosed with a dosing pump (4) into the rotor-/stator chamber at the point of highest turbulence/shear. This ensures a rapid oxidation reaction. The oxidized material (AOL) leaves the inline-reactor and is collected in suitable tanks.

Reaction Product

The present invention is also directed to oxidized lignins prepared by the method according to the present invention.

The present inventors have surprisingly found, that the oxidized lignins prepared according to the method of the present invention have very desirable reactivity properties and at the same time display improved fire resistance properties when used in products where they are comprised in a binder composition, and improved long term stability over previously known oxidized lignins.

The oxidised lignin also displays improved hydrophilicity.

An important parameter for the reactivity of the oxidized lignins prepared by the method according to the present invention is the carboxylic acid group content of the oxidized lignins.

In one embodiment, the oxidized lignin prepared according to the present invention has a carboxylic acid group content of 0.05 to 10 mmol/g, such as 0.1 to 5 mmol/g, such as 0.20 to 2.0 mmol/g, such as 0.40 to 1.5 mmol/g, such as 0.45 to 1.0 mmol/g, based on the dry weight of component (i).

Another way to describe the carboxylic acid group content is by using average carboxylic acid group content per lignin macromolecule according to the following formula:

$$\text{Average COOH functionality} = \text{total moles COOH}/\text{total moles lignin}$$

In one embodiment, the oxidized lignin prepared according to the present invention has an average carboxylic acid group content of more than 1.5 groups per macromolecule of component (i), such as more than 2 groups, such as more than 2.5 groups.

In one embodiment, oxidized lignin according to the present invention comprises ammonia-oxidised lignin (AOL).

Use of the Oxidized Lignins

In view of the properties described above, the oxidized lignins prepared by the method according to the present invention can be used for many purposes.

One such use is the use as a component in a binder composition for different purposes, like foundry sand, glass fibre tissue, composites, moulded articles, coatings, such as metal adhesives.

A particularly preferred use is the use as a component in an aqueous binder composition for mineral fibres.

Another use is the use of the oxidized lignin as a component in an aqueous adhesive composition for lignocellulosic materials, such as wood.

Examples of lignocellulosic materials include but are not limited to solid wood, wood fibers, sawdust, paper, straw.

The following examples are intended to further illustrate the invention without limiting it's scope.

EXAMPLES

In the following examples, several oxidized lignins which fall under the definition of the present invention were prepared.

The following properties were determined for the oxidized lignins according to the present invention:

Component Solids Content:

The content of each of the components in a given oxidized lignin solution is based on the anhydrous mass of the components or as stated below.

Kraft lignin was supplier by UPM as BioPiva100™ as dry powder. NH$_4$OH 25% was supplied by Sigma-Aldrich and used in supplied form. H$_2$O$_2$, 30% (Cas no 7722-84-1) was supplied by Sigma-Aldrich and used in supplied form or by dilution with water. PEG 200 was supplied by Sigma-Aldrich and were assumed anhydrous for simplicity and used as such. PVA (Mw 89.000-98.000, Mw 85.000-124.000, Mw 130.000, Mw 146.000-186.000) (Cas no 9002-89-5) were supplied by Sigma-Aldrich and were assumed anhydrous for simplicity and used as such. Urea (Cas no 57-13-6) was supplied by Sigma-Aldrich and used in supplied form or diluted with water. Glycerol (Cas no 56-81-5) was supplied by Sigma-Aldrich and was assumed anhydrous for simplicity and used as such.

Oxidized Lignin Solids

The content of the oxidized lignin after heating to 200° C. for 1 h is termed "Dry solid matter" and stated as a percentage of remaining weight after the heating. Disc-shaped stone wool samples (diameter: 5 cm; height 1 cm) were cut out of stone wool and heat-treated at 580° C. for at least 30 minutes to remove all organics. The solids of the binder mixture were measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the dry solids matter was calculated as an average of the two results.

COOH Group Content

The change in COOH group content was also determined by aqueous titration and utilization of the following formula:

$$C_{(COOH,mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{1s}$ are endpoint volumes of a sample while $V_{2b}$ and $V_{1b}$ are the volume for a blank sample. $C_{acid}$ is 0.1M HCl in this case and $m_{s,g}$ is the weight of the sample.

Method of producing an oxidized lignin:
1) Water and lignin was mixed in a 3-necked glass bottomed flask at water bath at room temperature (20-25° C.) during agitation connected with a condenser and a temperature logging device. Stirred for 1 h.
2) Ammonia was added during agitation in 1 portion.
3) Temperature increased to 35° C. by heating, if the slightly exothermic reaction with ammonia does not increase the temperature.
4) pH was measured.
5) Plasticizer PEG200 was added and stirred 10 min.
6) After the lignin was completely dissolved after approximately 1 hour, 30% H2O2 was added slowly in one portion.
7) The exothermic reaction by addition of H2O2 increased the temperature in the glass bottomed flask— if the reaction temperature was lower than 60 C, the temperature was increased to 60° C. and the sample was left at 60° C. for 1 hour.
8) The round bottomed flask was then removed from the water bath and cooled to room temperature.
9) Samples were taken out for determination of dry solid matter, COOH, viscosity, density and pH.

Oxidized Lignin Compositions According to the Present Invention

In the following, the entry numbers of the oxidized lignin example correspond to the entry numbers used in Table 1.

Example 1

71.0 g lignin UPM Biopiva 100 was dissolved in 149.0 g water at 20° C. and added 13.3 g 25% NH$_4$OH and stirred for 1 h by magnetic stirrer, where after 16.8 g H$_2$O$_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example 5

71.0 g lignin UPM Biopiva 100 was dissolved in 88.8 g water at 20° C. and added 13.3 g 25% NH$_4$OH and stirred for 1 h by magnetic stirrer. PEG 200, 22.8 g was added and stirred for 10 min, where after 16.7 g H$_2$O$_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example 3

71.0 g lignin UPM Biopiva 100 was dissolved in 57.1 g water at 20° C. and added 13.3 g 25% NH$_4$OH and stirred for 1 h by mechanical stirrer, where after 16.6 g H$_2$O$_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example 6

71.0 g lignin UPM Biopiva 100 was dissolved in 57.1 water at 20° C. and added 13.3 g 25% NH$_4$OH and stirred for 1 h by mechanical stirrer. PEG 200, 19.0 g was added and stirred for 10 min, where after 16.6 g H₂O₂ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

TABLE 1

| Materials, weight in grams: | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Lignin | 71.0 | 71.0 | 71.0 | 71.0 | 71.0 | 71.0 | 71.0 | 71.0 | 71.0 | 71.0 |
| Water | 149.0 | 88.8 | 57.1 | 17.7 | 88.8 | 57.1 | 17.7 | 88.8 | 57.1 | 17.7 |
| NH4OH (25 wt % solution in water) | 13.3 | 13.3 | 13.3 | 13.4 | 13.3 | 13.3 | 13.4 | 13.3 | 13.3 | 13.4 |
| H2O2 (30 wt % solution in water) | 16.8 | 16.7 | 16.6 | 17.2 | 16.7 | 16.6 | 17.2 | 16.7 | 16.6 | 17.2 |
| PEG200 | 0.0 | 0.0 | 0.0 | 0.0 | 22.8 | 19.0 | 14.2 | 0.0 | 0.0 | 0.0 |
| PVA | 0 | 0 | 0 | 0 | 0 | 0 | 0 | 5 | 10 | 15 |
| Urea (25 wt % solution in water) | 0 | 0 | 0 | 0 | 0 | 0 | 0 | 0 | 0 | 0 |
| Glycerol | 0 | 0 | 0 | 0 | 0 | 0 | 0 | 0 | 0 | 0 |
| Sorbitol | 0 | 0 | 0 | 0 | 0 | 0 | 0 | 0 | 0 | 0 |
| Dry solid matter in %, 200° C., 1 h | 18.2 | 27.1 | 30.5 | 40.1 | 26.5 | 33 | 40.3 | 28.2 | 34.4 | 46.3 |
| pH | 9.5 | 9.5 | 9.5 | 9.5 | 9.5 | 9.5 | 9.5 | 9.5 | 9.5 | 9.5 |
| Viscosity, 20° C. cP | 450.5 | 25000 | above 100000 | above 100000 | 15000 | 25000 | 50000 | 15000 | 25000 | 50000 |
| Appearance | ** | *** | * | * | *** | *** | *** | *** | *** | *** |
| COOH, mmol/g | 1.1 | 0.9 | 0.9 | 0.8 | 0.8 | 1.9 | — | — | — | — |
| Initial lignin conc. Weight fraction of aq. sol. | 0.32 | 0.44 | 0.55 | 0.80 | 0.44 | 0.55 | 0.80 | 0.44 | 0.55 | 0.80 |

| Materials, weight in grams: | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| Lignin | 71.0 | 71.0 | 71.0 | 71.0 | 71.0 | 71.0 | 93.5 | 112.3 | 149.5 |
| Water | 88.8 | 57.1 | 17.7 | 88.8 | 57.1 | 17.7 | 117 | 90.3 | 37.3 |
| NH4OH (25 wt % solution in water) | 13.3 | 13.3 | 13.4 | 13.3 | 13.3 | 13.4 | 17.5 | 21 | 28.3 |
| H2O2 (30 wt % solution in water) | 16.7 | 16.6 | 17.2 | 16.7 | 16.6 | 17.2 | 22 | 26.3 | 36.3 |
| PEG200 | 0.0 | 0.0 | 0.0 | 0.0 | 0.0 | 0.0 | 0.0 | 0.0 | 0.0 |
| PVA | 0 | 0 | 0 | 0 | 0 | 0 | 0 | 0 | 0 |
| Urea (25 wt % solution in water) | 3.2 | 3.8 | 5.0 | 0 | 0 | 0 | 0 | 0 | 0 |
| Glycerol | 0 | 0 | 0 | 16.0 | 21.0 | 30.0 | 0 | 0 | 0 |
| Sorbitol | 0 | 0 | 0 | 0 | 0 | 0 | 16.0 | 21.0 | 30.0 |
| Dry solid matter in %, 200° C., 1 h | 25.1 | 30.2 | 40.2 | 25.3 | 29.3 | 40.3 | 25.3 | 30.5 | 38.8 |
| pH | 9.5 | 9.5 | 9.5 | 9.5 | 9.5 | 9.5 | 9.5 | 9.5 | 9.5 |
| Viscosity, 20° C. cP | 15000 | 25000 | 50000 | 15000 | 25000 | 50000 | 15000 | 25000 | 50000 |
| Appearance | *** | *** | *** | *** | *** | *** | *** | *** | *** |
| COOH, mmol/g | — | — | — | — | — | — | — | — | — |

TABLE 1-continued

| | | | | | | | | |
|---|---|---|---|---|---|---|---|---|
| Initial lignin conc. Weight fraction of aq. sol. | 0.44 | 0.55 | 0.80 | 0.44 | 0.55 | 0.80 | 0.44 | 0.55 | 0.80 |

* inhomogenous black thick solution;
** black solution;
*** homogenous black thick solution.

The invention claimed is:

1. A method for producing oxidized lignins, wherein the method comprises contacting
   a component (i) comprising one or more lignins,
   a component (ii) comprising ammonia,
   a component (iii) comprising one or more oxidizing agents which include hydrogen peroxide,
   a component (iv) comprising one or more plasticizers which include polyethylene glycol,
   mass ratios of lignin, ammonia, hydrogen peroxide and polyethylene glycol being such that based on 1 part by weight of dry lignin an amount of ammonia is from 0.01 to 0.5 parts by weight, an amount of hydrogen peroxide, 30 weight % solution in water, is from 0.025 to 1.0 parts by weight, and an amount of polyethylene glycol is from 0.03 to 0.60 parts by weight.

2. The method of claim 1, wherein component (i) comprises one or more lignins selected from kraft lignins, soda lignins, lignosulfonate lignins, organosolv lignins, lignins from biorefining processes of lignocellulosic feedstocks, or any mixture thereof.

3. The method of claim 1, wherein component (i) comprises one or more kraft lignins.

4. The method of claim 1, wherein component (iii) further comprises one or more oxidizing agents selected from organic or inorganic peroxides, molecular oxygen, ozone, halogen containing oxidation agents, or any mixture thereof.

5. The method of claim 1, wherein component (iv) further comprises one or more plasticizers selected from polyols, hydrogenated sugars, glycerol, monoethylene glycol, polyethylene glycol ethers, polyethers, phthalates and/or acids, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, urea, or any mixtures thereof.

6. The method of claim 1, wherein component (iv) further comprises one or more plasticizers selected from polyols, hydrogenated sugars, glycerol, monoethylene glycol, polyvinyl alcohol, acrylic based polymers with free carboxy groups and/or polyurethane dispersions with free carboxy groups, urea, or any mixtures thereof.

7. The method of claim 1, wherein the method comprises contacting component (i), component (ii), component (iii) and a component (v) in the form of an oxidation catalyst.

8. The method of claim 1, wherein the method comprises providing component (i) in the form of an aqueous solution and/or dispersion of one more lignins, a lignin content of the aqueous solution being from 5 to 90 weight-%, based on a total weight of the aqueous solution;
   adjusting a pH of the solution and/or dispersion by adding component (ii);
   addition of component (iv);
   whereafter component (iii) is added.

9. The method of claim 8, wherein the pH is adjusted to a value of ≥9.

10. The method of claim 8, wherein during an oxidation a temperature is allowed to rise to more than 35° C. and is then controlled in a range of 35-150° C.

11. The method of claim 10, wherein an oxidation is carried out for a time of from 1 second to 24 hours.

12. The method of claim 1, wherein a viscosity of the oxidized lignins is from 100 cP to 100,000 cP.

13. The method of claim 1, wherein the method is performed as a continuous process.

14. The method of claim 1, wherein the method affords an oxidized lignin having a carboxylic acid group content of from 0.05 to 10 mmol/g, based on a dry weight of component (i).

15. The method of claim 14, wherein the method affords an oxidized lignin having a carboxylic acid group content of from 0.1 to 5 mmol/g.

16. The method of claim 14, wherein the method affords an oxidized lignin having a carboxylic acid group content of from 0.20 to 2.0 mmol/g.

17. The method of claim 1, wherein the method affords an oxidized lignin having an average carboxylic acid group content of more than 1.5 groups per macromolecule of component (i).

18. The method of claim 1, wherein the method affords an oxidized lignin having an average carboxylic acid group content of more than 2 groups per macromolecule of component (i).

19. The method of claim 1, wherein the method affords an oxidized lignin which is suitable as a component of an aqueous binder composition for mineral fibers.

20. The method of claim 1, wherein an apparatus comprising a rotor-stator device is used to carry out the contacting the component (i), the component (ii), the component (iii), and the component (iv).

* * * * *